United States Patent Office 3,416,081
Patented Dec. 10, 1968

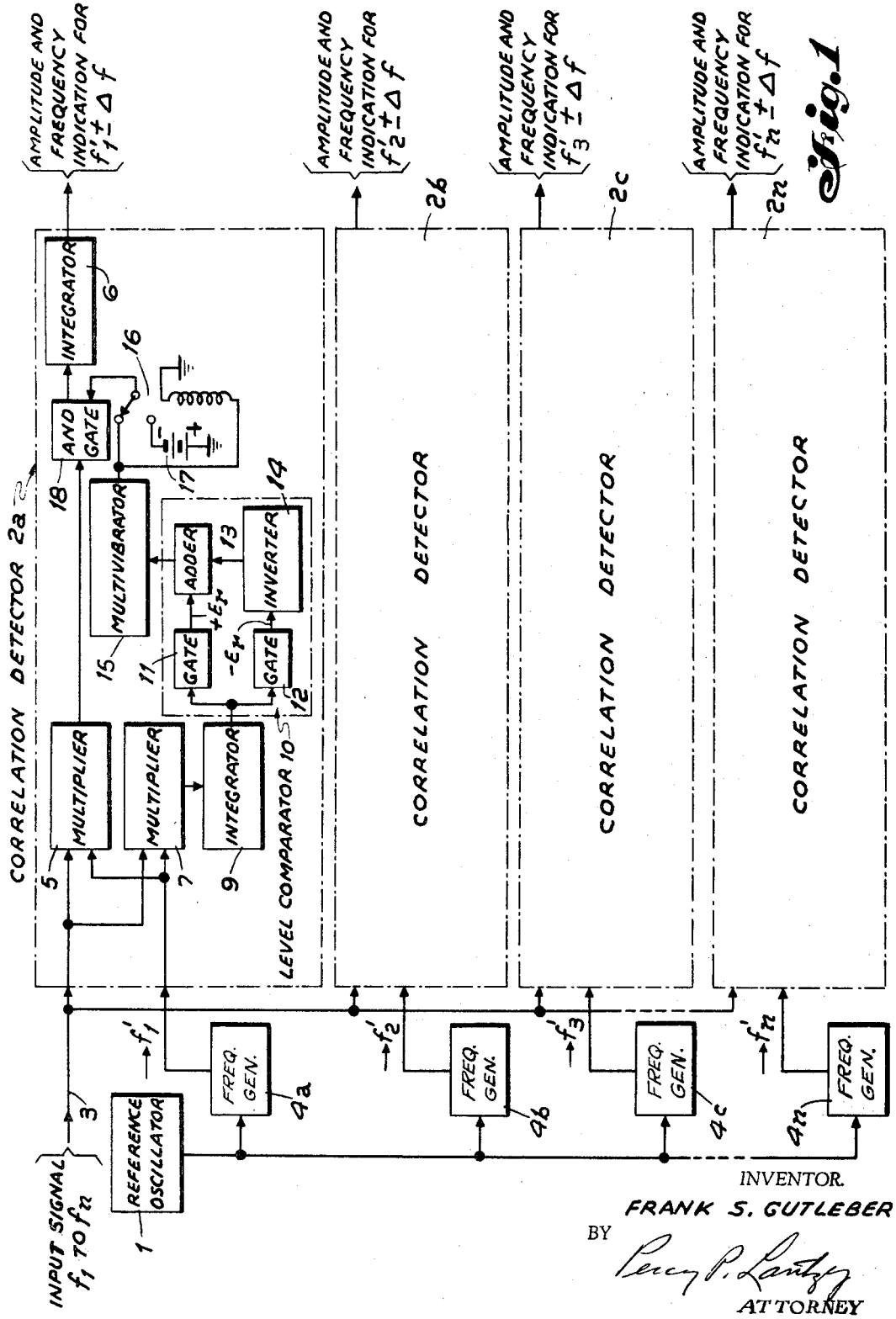

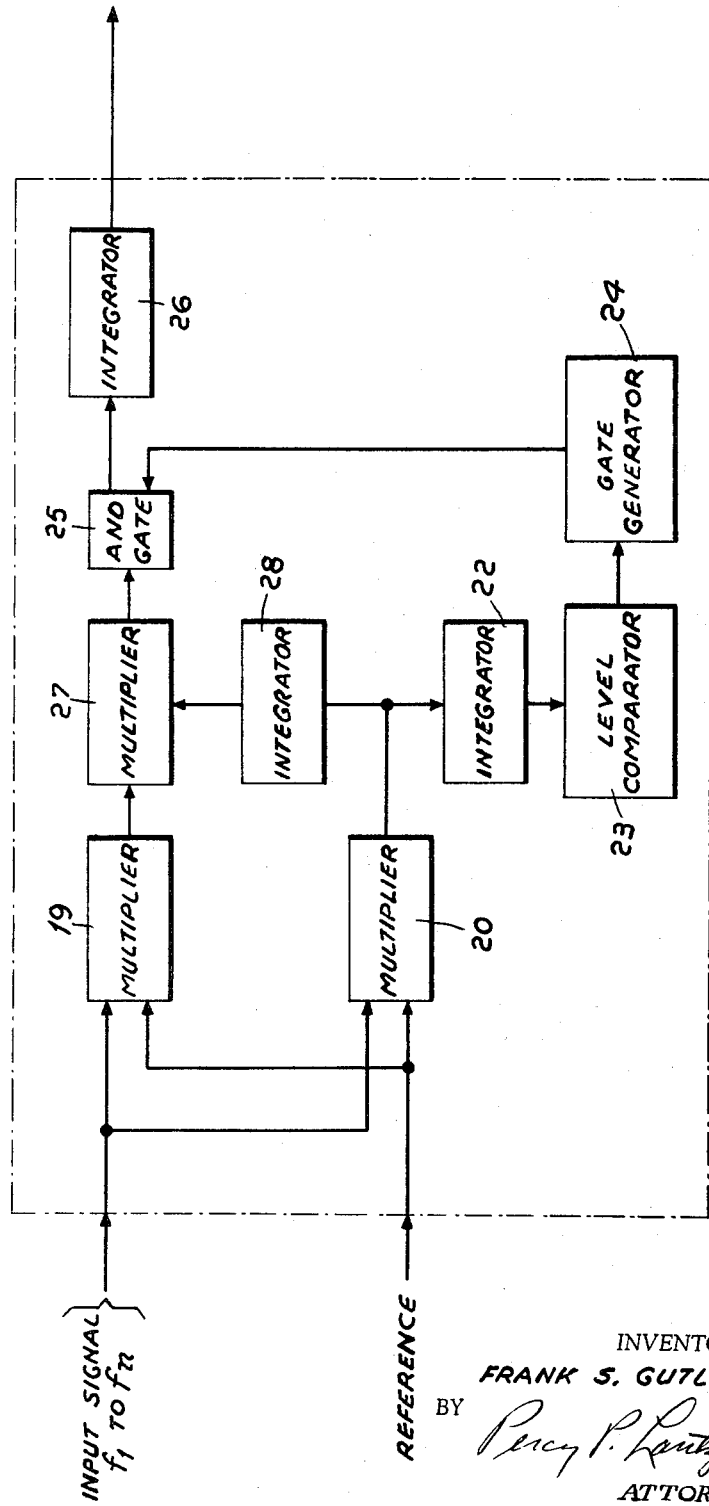

3,416,081
FREQUENCY SPECTRUM ANALYZER UTILIZING CORRELATION DETECTORS WHEREIN THE OUTPUT IS SUPPRESSED UNTIL A PARTICULAR RESPONSE IS OBTAINED
Frank S. Gutleber, Wayne, N.J., assignor to International Telephone and Telegraph Corporation, Nutley, N.J., a corporation of Maryland
Filed Sept. 8, 1965, Ser. No. 485,865
9 Claims. (Cl. 324—77)

ABSTRACT OF THE DISCLOSURE

A plurality of correlation detectors each including a multiplier responding to an incoming signal to be frequency analyzed and a particular different reference frequency for each detector, a narrow band filter or integrator to provide an output when the incoming signal includes the reference frequency, and a circuit responding to the incoming frequency and the reference frequency to control the application of input signal to the filter from the multiplier so as to cut off the output signal from the filter abruptly at the upper and lower limits of a predetermined band of frequencies around the reference frequency.

---

This invention relates to spectrum analyzers and has for its principal object to provide a spectrum analyzer which is capable of analyzing the frequency spectrum of a complex signal under very poor signal-to-noise ratios.

Another object of the invention is to provide such a spectrum analyzer which does not require sweeping the frequency band being analyzed.

Another object of the invention is to provide a spectrum analyzer in which almost any desired degree of resolution is obtainable depending on the specific design of the circuitry.

Still another object of the invention is to provide a spectrum analyzer which makes use of cross-correlation filters to effect extreme narrow banding, the cross-correlation filters acting to establish the presence of a particular frequency $f$ plus or minus some $\Delta f$ frequency, and in addition, the amplitude of the specific spectral line.

Another object of the invention is to provide a spectrum analyzer utilizing a plurality of narrow band correlation filters connected in parallel, so that their outputs simultaneously provide the amplitude and frequencies comprising the unknown input signal.

The objects of the invention are accomplished by connecting a plurality of narrow band correlation filters or detectors in parallel each of said filters giving a direct current or slowly varying frequency output corresponding to the amplitude of a particular frequency and being provided with a special circuit which will cut off the output of the filter abruptly at the upper and lower limits of a predetermined band of frequencies around said particular reference frequency.

The invention is illustrated in the accompanying drawings in which;

FIG. 1 is a block diagram of one form of spectrum analyzer of the invention; and FIG. 2 is a block diagram of a modified form of the analyzer shown in FIG. 1.

Referring now to the drawing, the analyzer of the invention comprises a stable reference oscillator 1 and a plurality of correlation detectors or filters 2a, 2b, 2c . . . 2n, each adapted to detect a particular frequency and to indicate the amplitude thereof. The number of the correlation filters required depends on the number of specific spectral lines to be detected in the incoming signal. Such an incoming signal of unknown frequency composition is applied to an input lead 3 and is delivered in parallel to all the detectors. Since these detectors are identical in construction, only the detector 2a will be described in detail.

A different reference frequency is applied to each of the correlation filters, and these different frequencies are derived from the reference oscillator 1. Accordingly, frequency generators 4a, 4b, 4c, and 4n, are shown connected to the reference oscillator, and each translates the frequency from the reference oscillator to provide the individual reference frequency for its associated filter. Thus, frequency generator 4a will produce a frequency $f_1'$, frequency generator 4b, a frequency $f_2'$, frequency generator 4c, a frequency $f_3'$, and frequency generator 4n, a frequency $f_n'$. Each of the frequency generators could be implemented by a stable local oscillator generating a different frequency, a mixer coupled to the local oscillator and oscillator 1 to produce difference and sum frequencies, and a filter to select the desired one of the differences and sum frequencies to provide the desired reference frequency.

The correlation detector or filter 2a will now be described. The main components of the detector are a multiplier 5, to which the input signal from the lead 3 and the reference frequency $f_1'$ from frequency generator 4a are delivered, and an integrator 6 which integrates the output of the multiplier 5 to produce a direct current voltage or slowly varying frequency, the presence of which indicates the presence of the frequency $f_1 \pm \Delta f$ and the value of which is a measure of the amplitude of the frequency $f_1 \pm \Delta f$.

It can be shown that a single cross-correlator essentially translates a given frequency term to direct current and readily facilitates narrow banding around the given frequency term to extremely small values. That is, the band width can approach zero cycles per second and, correspondingly, the signal-to-noise ratio improvement can reach infinity. The reference frequency oscillator and the local oscillator should be as stable as possible, the degree of stability being determined by the specific design of the system with regard to how narrow the desired band of the correlation filters is to be. Preferably the variations of the reference oscillator and the local oscillator should be periodically checked against some absolute standard and continuously corrected. In this case, variations of the outputs of the correlator filters would only be a function of the drift of the input. The rate of change of the input frequency in addition to the maximum difference realized would, in essence, be the main limiting factor on how narrow band the final system could be. However, for reasonable values of the short term frequency stability, operation would be possible down to very low signal-to-noise ratios.

The necessary condition to be satisfied is that the period of time that any frequency spectral line stays within the band width of its corresponding correlation filter should be equal to at least 2.5 times the time constant of the integrator for the correlation detector. If this condition were not satisfied, then the output of the detectors would not build up to the maximum possible peak signal value and the result would be a degradation in the signal-to-noise threshold for the system in addition to obtaining an incorrect amplitude indication of the spectral frequency terms.

For the purpose of this description, it is assumed that the above required stability conditions have been met. These required stability conditions for the input signal and the reference oscillator can be easily calculated for any specific application of the invention.

The output of the integrator 6 of each correlation filter 2a, 2b, 2c . . . 2n will be a direct current signal or a slowly varying alternating current signal of constant amplitude within a band width from a direct current out to $\Delta f$ which is the increment of frequency at each side of the particular spectral line which the correlation filter is adapted to indicate. It is desired to have zero output beyond $\Delta f$, and one manner of providing such a sharp cut-off for the filter will be described subsequently.

When these conditions are met, simply monitoring the various outputs of the correlation detectors $2a$ to $2n$ will establish the amplitudes and frequencies within $\pm \Delta f$ of the input spectrum. The resolution of the spectrum analyzer will be $\pm \Delta f$ and the signal-to-noise threshold for the system will be better than an ordinary analyzer in the ratio of $$\sqrt{\frac{\text{R.F.B.W.}}{2\Delta f}}$$

where R.F.B.W. is the carrier band width and $2\Delta f$ the correlation filter band width. That is, if a standard type of analyzer had a band width of, say, 1 megacycle, and could operate down to a signal-to-noise $(S/N)$ threshold of $+20$ db $(S=10 \times N_{\text{rms}})$, then for a proposed system whose correlation band width might be, say, 100 cycles, operation would be possible for a signal-to-noise ratio $(S/N)$ of $-20$ db with a resolving power of 100 cycles. This improved operation would be obtained at the expense of requiring 10,000 cross-correlation detectors. If, however, time were not an important factor, then a lesser number of cross-correlators could be used, and the reference source could be switched over several bands to cover the required band width of the signal being analyzed. In essence, the frequency resolving power required or desired for the system, in conjunction with the signal spectrum band width, dictates the signal-to-noise threshold operation of the required number of cross correlation detectors for the system.

In order practically to achieve the desired results, the following conditions must be met: narrow band, low pass filters must be provided whose output attenuation is constant out to the cut-off frequency and approaches infinity at the cut-off frequency of the filter. I have found that I can achieve the cut-off characteristics mentioned above by gating the input to the low pass filter, whose output forms the output of the detector, so that no output occurs beyond a point where the attenuation curve begins to drop, which is the desired cut-off $\pm \Delta f$.

To this end, I provide a second multiplier 7 which also receives the incoming signal. The multiplier 7 also receives the reference frequency $f_1'$ from frequency generator $4a$ in the particular case. The output of the multiplier 7 is fed to a second integrator 9 which should have a narrower band width than that of the integrator 6. The output of the integrator 9 will then produce a sinusoidally varying signal whose frequency is equal to the frequency difference between the frequency of the signal input and that of the reference frequency and whose amplitude is equal to the input amplitude times the transfer function of the integrator 9. This signal is fed into a level comparator 10 which is adapted to have an output only when the signal amplitude is above a predetermined value, which value may be chosen so that the output appears only within the desired band width.

The level comparator 10 may comprise two gates 11 and 12 which are fed in parallel from the output of the integrator 9. These gates are threshold gates, the gate 11 being arranged in a known manner to provide an output of a predetermined positive value $+E_r$ only when its input exceeds that predetermined positive value, while the gate 12 is arranged to produce an output of a predetermined negative value $-E_r$ only when its input is below that predetermined negative value. The outputs of gates 11 and 12 are brought together in an adder 13 after passing the output of gate 12 through an inverter 14. The result is that pulses of $+E_r$ are produced when the output of the integrator 9 has a positive voltage above that value and pulses also of $+E_r$ when the output of integrator 9 has a negative voltage below $-E_r$.

These positive pulses whose widths represent the times when the outputs of the integrator exceeds $\pm E_r$ are then fed into a bistable multivibrator 15 to produce a square wave the width of whose positive and negative pulses represent the times when the output of the integrator 9 exceeds $\pm E_r$. The absence of pulses represents the time when the output of integrator 9 is within the limits of $+E_r$ and $-E_r$.

The output of this multivibrator 15 may then be rectified by means of a chopper rectifier, indicated by the relay 16. The arrangement is such that positive pulses operate the relay, the make contact of which is connected to a source of negative potential, indicated by the battery 17, and the break contact is connected to the output of the multivibrator. The armature is then connected to one input of an AND gate 18 whose other input is connected to the output of the multiplier 5, while the output of the gate is connected to the integrator 6.

Each positive pulse from the multivibrator 15 operates the relay 16 causing the make contact to close to send a negative potential to the gate 18. Each negative pulse from the multivibrator leaves the relay 16 in its normal position, so that the negative pulse is delivered to the gate. Thus, either positive or negative pulses from the multivibrator causes negative pulses to be delivered to the gate 18, but when no pulses are delivered from the multivibrator, no pulses are delivered to the gate 18.

The arrangement of the gate 18 is such that pulses from both the multiplier 5 and the relay 16 are necessary for the gate to produce an output. Hence no output is obtained from the integrator 6 unless pulses are received from the relay 16, and, since these pulses only appear when the signal from the multiplier 7 is greater in amplitude than a predetermined value, and, since this only occurs between the values of $+\Delta f$ and $-\Delta f$, the output of the integrator has a sharp cut-off to zero at these limits.

The frequencies at which a particular correlation detector cuts off may be selected by selecting the values of the voltage $E_r$ at which the gates 11 and 12 become effective and in turn set the value of signal reduction to the input of the level comparator 10 which produces a zero output for the level comparator. The choice of such an amplitude reduction is arbitrary, since any convenient value can be used. The final choice should be an amplitude which corresponds to a frequency far enough removed from the cut-off frequency of the integrator or low pass filter 7 so that an accurate level comparison can be made. However, the final operation signal-to-noise ratio obtainable is a function of how close the system cut-off frequency is to the cut-off frequency of the integrator 9. This can be mathematically verified.

A modification of the system of FIG. 1 is shown in FIG. 2 and provides certain advantages. Here, instead of directly filtering the output of the multiplier 5 of FIG. 1, this output is correlated with the output of the multiplier 7. This can be done, since these two signals will be coherent.

In the figure, the multiplier 19, the multiplier 20, the integrator 22, the level comparator 23, the gate generator 24, the AND gate 25, and the integrators 26 and 28 correspond with the multiplier 5, the multiplier 7, the integrator 9, the level comparator 10, the gate generator 15–16–17, the AND gate 18, and the integrator 6 of FIG. 1. A third multiplier 27, however, is connected to receive the outputs of the multipliers 19 and 20. The output of this third multiplier 27 is connected to the AND gate 25.

The result of this arrangement will be that a direct current component will always be obtained by this third multiplication process, regardless of the frequency difference between the input signal and the reference signal.

It is still necessary to use, the lever comparator 23, and the gate generator 24 to control the AND gate 25 before filtering the output of multiplier 19; otherwise, all the signal frequency terms within the bandwidth of integrator 28 would be translated to direct current and result in an output from the integrator 26.

For this modified system, the multiplier 27 must be capable of operating for very low frequencies. However, assuming that this can be achieved, the resulting system would have the following advantages:

(1) Since the output indication would always be essentially direct current and constant, a comparatively fast sample could be taken of all the correlator outputs for displaying on a scope. This could be done after a preliminary waiting period which would be a function of the degree of narrow banding used in the system.

(2) Integrator 26 could be made more narrow band than integrator 22. In the arrangement of FIG. 1, the band width of integrator 6 necessarily has to be greater than that of integrator 9. Being able to narrow band integrator 26 more than integrator 22 enables the system to achieve a better signal-to-noise ratio for the monitored output than can be accomplished with the ararngement of FIG. 1.

From the above it will be seen that I have provided a frequency-spectrum analyzer which can be used to analyze the frequency spectrum of a complex signal and to do so under very poor signal-to-noise ratios. Almost any desired degree of resolution can be obtained by suitably designing the circuit.

Modifications may be made in the specific arrangements shown and described without departing from the spirit of the invention, and I do not therefore desire to limit myself to what has been shown and described except by the limitations contained in the appended claims.

I claim:

1. A correlation spectrum analyzer comprising:
   a plurality of correlation detectors, one for each frequency to be detected, each of said detectors having a bandwidth including a predetermined small frequency increment above and below the frequency to be detected and a constant attenuation output extending to the cut-off frequencies and which attenuation approaches infinity at the cut-off frequency;
   means for producing a plurality of different frequencies, corresponding to the frequencies to be detected;
   means for applying said different frequencies respectively to said correlation detectors; and
   means for receiving an incoming signal and feeding to each of said correlation detectors;
   each correlation detector comprising;
   a first multiplier;
   means for feeding the incoming signal to be analyzed to said first multiplier;
   means for feeding the reference frequency for that particular correlation detector to said first multiplier, whereby if said reference frequency appears in said incoming signal, the output of said first multiplier will have a high amplitude;
   an AND gate;
   means for feeding the output of said first multiplier to one input of said AND gate;
   means for integrating the signal produced by said AND gate to provide the output of said detector;
   a second multiplier;
   means for feeding said incoming signal to said second multiplier;
   means for feeding said reference frequency to said second multiplier;
   means for integrating the signal produced by said second multiplier;
   means connected to said last-mentioned integrating means for producing control pulses of a predetermined constant voltage, each pulse having a time duration corresponding to the time the signal from the last-mentioned integrating means exceeds a predetermined positive voltage or a predetermined negative voltage; and
   means for feeding said control pulses to another input of said AND gate, whereby said gate will produce an output only when a control pulse is present, so that the detector has a sharp cut-off.

2. A correlation spectrum analyzer, as defined in claim 1, in which the means for producing the control pulses comprises:
   a first gate adapted to produce an output only when the signal applied to it exceeds a predetermined positive voltage;
   a second gate adapted to produce an output only when the signal applied to it exceeds a predetermined negative voltage;
   means for feeding the integrated signal from the second multiplier to both gates in parallel;
   means for inverting the output of one of said gates;
   means for combining the output of the other of said gates and the inverted output of said one gate;
   a bistable multivibrator;
   means for utilizing the combined signals from said first and second gates to operate said multivibrator; and
   means for rectifying the output of said multivibrator to produce said control pulses.

3. A correlation spectrum analyzer, as defined in claim 2, in which the level comparator is adapted to cut off when the intensity of the signal applied to it is less than a predetermined value of the incoming signal.

4. A correlation spectrum analyzer, as defined in claim 1, in which the level comparator is adapted to cut off when the intensity of the signal applied to it is less than a predetermined value of the incoming signal.

5. A correlation spectrum analyzer comprising:
   a low pass filter for a predetermined frequency range having a substantially flat attenuation curve;
   means for producing a reference frequency within said range;
   means for combining said reference frequency with an incoming signal having a plurality of frequencies;
   means for feeding said combined reference frequency and signal to said filter; and
   means controlled by said incoming signal and said reference frequency and responsive to the amplitude of frequencies in the signal a predetermined number of cycles above and below said reference frequency for reducing the output of said filter substantially to zero at the upper and lower limits of said predetermined frequency range.

6. A correlation spectrum analyzer comprising:
   a low pass filter for a predetermined frequency range having a substantially flat attenuation curve;
   means for producing a reference frequency within said range;
   means for combining said reference frequency with an incoming signal;
   means for feeding said combined reference frequency and signal to said filter; and
   means controlled by said incoming signal and said reference frequency and responsive to the amplitude of frequencies in the signal a predetermined number of cycles above and below said reference frequency for reducing the output of said filter substantially to zero at the upper and lower limits of said predetermined frequency range;
   the means for reducing the output of the filter substantially to zero at the upper and lower limits of said predetermined frequency range comprising;
   a gate in said filter for controlling the output thereof;
   means for utilizing the incoming signal for a control channel;
   means for combining said reference frequency and said input signal;
   means for integrating the signal so combined;

means for detecting positive voltages in said integrated signal above a predetermined value;
means for detecting negative voltages in said integrated signal below a predetermined value; and
means for utilizing said detected voltages above and below said predetermined values for controlling the operation of said gate so as to cut off the output of said filter at the upper and lower limits of the predetermined frequency range.

7. A correlation spectrum analyzer comprising:
a plurality of correlation detectors, one for each frequency to be detected, each of said detectors having a band width including a predetermined small frequency increment above and below the frequency to be detected and a constant attenuation output extending to the cut-off frequencies and which attenuation approaches infinity at the cut-off frequency;
means for producing a plurality of different frequencies, corresponding to the frequencies to be detected;
means for applying said different frequencies respectively to said correlation detectors; and
means for receiving an incoming signal and feeding to each of said correlation detectors;
each correlation detector comprising:
a first multiplier;
means for feeding the incoming signal to said first multiplier;
an AND gate;
means for connecting the output of said first multiplier to said AND gate;
a first integrator having an output which is the output of said detector;
means for feeding the output of said AND gate to said first integrator;
a second multiplier;
means for feeding said incoming signal to said second multiplier;
a second integrator;
means for feeding the output of said second multiplier to said second integrator;
a first threshold gate adapted to produce an output only when the input exceeds a predetermined positive voltage;
a second threshold gate adapted to produce an output only when the input thereof exceeds a predetermined negative voltage;
means for inverting the output of said second threshold gate;
means for combining the output of said first threshold gate and the inverted output of said second threshold gate;
means for utilizing said combined output of said threshold gates for producing a control signal whenever the voltage output of said second integrator exceeds said predetermined positive voltage or said predetermined voltage; and
means for applying said signal to said AND gate, whereby said AND gate will produce an output only when said signal is present.

8. A correlation spectrum analyzer comprising:
a low pass filter for a predetermined frequency range having a substantially flat attenuation curve;
means for producing a reference frequency within said range;
a first multiplier for combining said reference frequency with an incoming signal;
a second multiplier;
means for feeding said incoming signal to said second multiplier;
means for feeding said reference frequency from said reference-frequency-producing means to said first and second multipliers;
a third multiplier adapted to operate for very low frequencies;
means for feeding the outputs of said first and second multipliers to said third multiplier;
an AND gate having two inputs;
means for feeding the output of said third multiplier to one input of said AND gate;
means for connecting the output of said AND gate to the input of said low pass filter;
means connected to the output of said second multiplier and controlled by the amplitude of frequencies in the output thereof a predetermined number of cycles above and below said reference frequency for producing a signal only when the amplitudes of said frequencies exceed a predetermined value; and
means connecting said last-mentioned means to said AND gate to enable said AND gate by said signal.

9. A correlation spectrum analyzer, as defined in claim 8, in which the means for producing the control signal comprises a filter which has a wider band width than the first filter which has a very narrow band width.

References Cited

UNITED STATES PATENTS

| 3,026,475 | 3/1962 | Applebaum | 324—77 |
| 3,157,781 | 11/1964 | Gruen. | |
| 3,290,590 | 12/1966 | Baker. | |
| 3,195,130 | 7/1965 | Adrian. | |

OTHER REFERENCES

Classification schedule for class 324, U.S. Patent Office, October 1955.

RUDOLPH V. ROLINEC, *Primary Examiner.*

P. F. WILLE, *Assistant Examiner.*

U.S. Cl. X.R.

235—181